(12) United States Patent
Kiehn et al.

(10) Patent No.: US 11,618,313 B2
(45) Date of Patent: Apr. 4, 2023

(54) GENERATOR ASSEMBLY FOR A HYBRID VEHICLE

(71) Applicant: Ford Global Technologies, LLC, Dearborn, MI (US)

(72) Inventors: Rainer Kiehn, Frechen (DE); Georg Louven, Neuwied (DE); Krystian Dylong, Cologne (DE); Christoph Niederhut, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 17/105,322

(22) Filed: Nov. 25, 2020

(65) Prior Publication Data

US 2021/0155091 A1    May 27, 2021

(30) Foreign Application Priority Data

Nov. 25, 2019    (DE) .......................... 102019131731.2

(51) Int. Cl.
| | |
|---|---|
| *B60K 11/00* | (2006.01) |
| *B60K 11/02* | (2006.01) |
| *B60W 20/10* | (2016.01) |
| *B60H 1/00* | (2006.01) |
| *B60K 6/26* | (2007.10) |
| *B60H 1/32* | (2006.01) |
| *B60K 1/00* | (2006.01) |
| *B60K 25/00* | (2006.01) |

(52) U.S. Cl.
CPC .............. *B60K 11/02* (2013.01); *B60H 1/004* (2013.01); *B60H 1/00428* (2013.01); *B60H 1/3208* (2013.01); *B60K 6/26* (2013.01); *B60W 20/10* (2013.01); *B60K 2001/003* (2013.01); *B60K 2025/005* (2013.01)

(58) Field of Classification Search
CPC .... B60K 11/02; B60K 6/26; B60K 2001/003; B60K 2001/001; B60K 2001/006; B60K 2025/005; B60K 1/00; B60K 6/22; B60H 1/004; B60H 1/00428; B60H 1/3208; B60W 20/10; B60Y 2200/92
See application file for complete search history.

(56) References Cited

U.S. PATENT DOCUMENTS

| 6,705,416 B1 | 3/2004 | Glonner et al. |
| 9,729,033 B2 | 8/2017 | Caine |
| (Continued) | | |

FOREIGN PATENT DOCUMENTS

DE    102012210880 A1    1/2014

OTHER PUBLICATIONS

"Electronic air conditioning—An overview of systems found in today's hybrid vehicle," Auto service Professional Website, Available Online at https://www.autoserviceprofessional.com/articles/2598-electronic-air-conditioning-an-overview-of-systems-found-in-today-s-hybrid-vehicles, Jun. 16, 2011, 11 pages.

*Primary Examiner* — Phutthiwat Wongwian
*Assistant Examiner* — Sherman D Manley
(74) *Attorney, Agent, or Firm* — Vincent Mastrogiacomo; McCoy Russell LLP

(57) ABSTRACT

Methods and systems are provided for a hybrid vehicle. In one example, a system comprises a first magnetic transmission configured to output power from a rotor shaft to a coolant pump and a second magnetic transmission configured to output power from the rotor shaft to an air-conditioner.

17 Claims, 4 Drawing Sheets

(56) References Cited

U.S. PATENT DOCUMENTS

| | | | |
|---|---|---|---|
| 11,125,141 B2* | 9/2021 | Kiehn | F04D 13/024 |
| 2013/0221778 A1* | 8/2013 | Kusase | H02K 7/108 |
| | | | 310/78 |
| 2013/0234553 A1* | 9/2013 | Kusase | H02K 51/00 |
| | | | 310/114 |
| 2016/0359441 A1* | 12/2016 | Calverley | H02P 17/00 |
| 2018/0238291 A1* | 8/2018 | Kiehn | F16H 9/04 |
| 2020/0088090 A1* | 3/2020 | Sugihara | B60H 1/3205 |
| 2021/0001714 A1* | 1/2021 | Oechslen | B60K 11/02 |
| 2021/0010766 A1* | 1/2021 | Dlala | F28F 27/02 |
| 2021/0039491 A1* | 2/2021 | Merz | F16H 57/0436 |
| 2021/0094443 A1* | 4/2021 | Aikawa | B60L 1/02 |
| 2022/0163132 A1* | 5/2022 | Jeong | B60H 1/00921 |
| 2022/0170467 A1* | 6/2022 | Whiteman | F04D 13/024 |

\* cited by examiner

GENERATOR ASSEMBLY FOR A HYBRID VEHICLE

FIELD

The present description relates generally to a generator assembly for a hybrid vehicle.

BACKGROUND/SUMMARY

Cooling systems in hybrid vehicles may present some challenges due to cooling demands of an engine and an electric motor. Hybrid vehicle may further include air-conditioning for a vehicle interior, which may increase the load on the hybrid vehicle cooling systems. Thus, a coolant pump may not be solely operated via the engine.

In the case of mild hybrid vehicles, in which the drive of the vehicle is not provided exclusively by the electric motor, it may also be desirable to be able to implement the abovementioned functions in an electric only mode, such as when a start/stop occurs and the engine is deactivated. One previous example includes providing three independent electric units, each having at least one dedicated electric motor. A first unit operates the compressor of the air-conditioning system. A second unit operates the coolant pump of a high-temperature cooling circuit which, in particular, passes through the internal combustion engine and possibly other vehicle components that are distinguished by high heat output. A third unit drives a coolant pump of a low-temperature cooling circuit, which can pass through various vehicle components with relatively low heat output, e.g. the electric motor/generator and other electric components. This solution may include high complexity, a large amount of installation space, and increase the vehicle weight. In addition, there may also be the possibility of coupling the compressor and/or at least one coolant pump mechanically (e.g. via a belt drive) to the main drive, i.e. the internal combustion engine and/or the electric motor. This solution may also be too complex since various mechanical transmission systems are used to connect the individual components. Another problem with this mechanical coupling may include a variable setting of the coolant flow, for example, which may be independent of the rotational speed of the main drive.

U.S. 2018/0238291 A1 discloses a hybrid module for an arrangement on an internal combustion engine, which is designed for starting said engine. The hybrid module comprises an electric motor for producing a torque and an output element, which is connected in a torque-transmitting manner to the electric motor and is positioned on an output axle, for transmitting the torque to a crankshaft of the internal combustion engine. The hybrid module has a magnetic transmission arranged centrally relative to the output axle, and the torque of the electric motor can be transmitted to the output element via the magnetic transmission.

U.S. 2016/0359441 A1 discloses a system having an input member, an output member, a magnetic transmission, which connects the input member and the output member, as well as a control unit, which controls a power flow from the input member to the output member. The magnetic transmission has a first group of magnet poles, a second group of magnet poles, and a group of magnetic pole pieces, which are designed to modulate the magnetic field between the first and the second group. The control unit has means for reducing the transmission of torque fluctuations and/or oscillations from the input member to the output member.

DE 10 2012 210 880 A1 shows a drive apparatus for a motor vehicle, having an internal combustion engine, which is connected to a transmission by an actuatable first clutch, and having at least one electric machine, which can be operatively connected to the internal combustion engine and/or to the transmission. The electric machine is connected to the internal combustion engine or to the transmission by an actuatable, electromagnetically operating second clutch. In particular, the second clutch can be designed as a magnetic powder clutch or a magnetorheological fluid coupling. The electric machine can be connected via a belt drive both to the second clutch and to a compressor of an air-conditioning system or to a coolant pump.

An electric machine for driving one or more auxiliary units of a motor is known from U.S. Pat. No. 9,729,033B2. The electric machine comprises a stator, which is configured to be rotated, and a rotor, which is mounted so as to be rotatable relative to the stator, wherein the rotational speed of the rotor of the electric machine depends on a supply current for the electric machine and on the rotational speed of the stator. As an option, the rotor can comprise a rotor of a water pump or oil pump and can have guide vanes designed to move a fluid. Likewise, as an option, the stator can be coupled by means of a magnetic clutch to an output shaft of the motor.

U.S. Pat. No. 6,705,416B1 discloses a hybrid drive for a motor vehicle having a drivetrain which, between an internal combustion engine and a variable-speed vehicle transmission, has a first electric machine and a second electric machine, which is permanently connected to a transmission input shaft. Respective shiftable clutches are arranged between the electric machines, which can each be operated as a motor and as a generator, and the internal combustion engine.

In one example, the issues described above may be addressed by a system comprising a system, comprising a generator comprising a rotor and a rotor shaft, an air-conditioner, and a coolant pump. A first magnetic transmission is configured to output power from the rotor shaft to the coolant pump and a second magnetic transmission is configured to output power from the rotor shaft to the air-conditioner. In this way, variable pump and air conditioner speeds may be generated while decreasing a packaging size.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
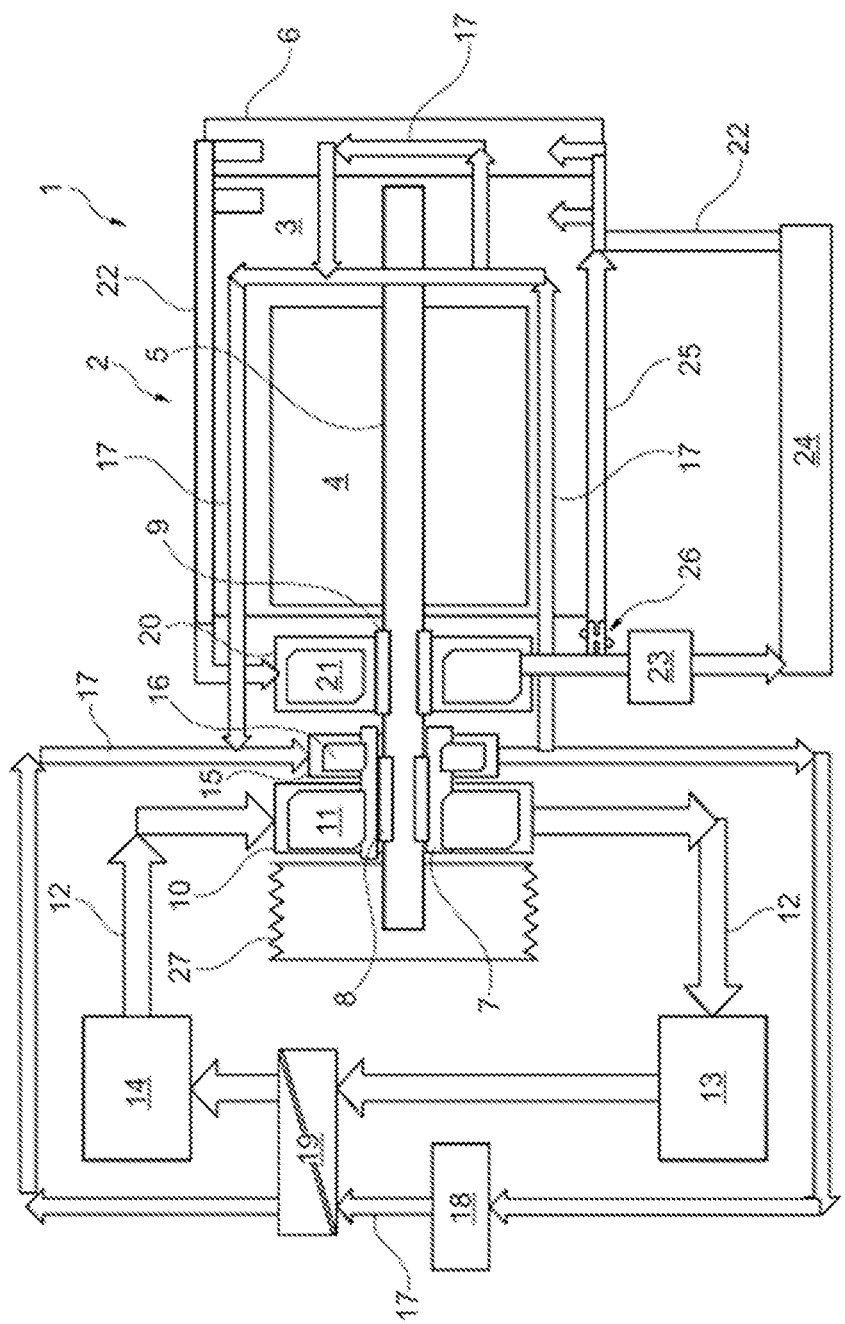
FIG. 1 shows a schematic illustration of a generator assembly according to the disclosure and of further components of a hybrid vehicle.
Figure 2:
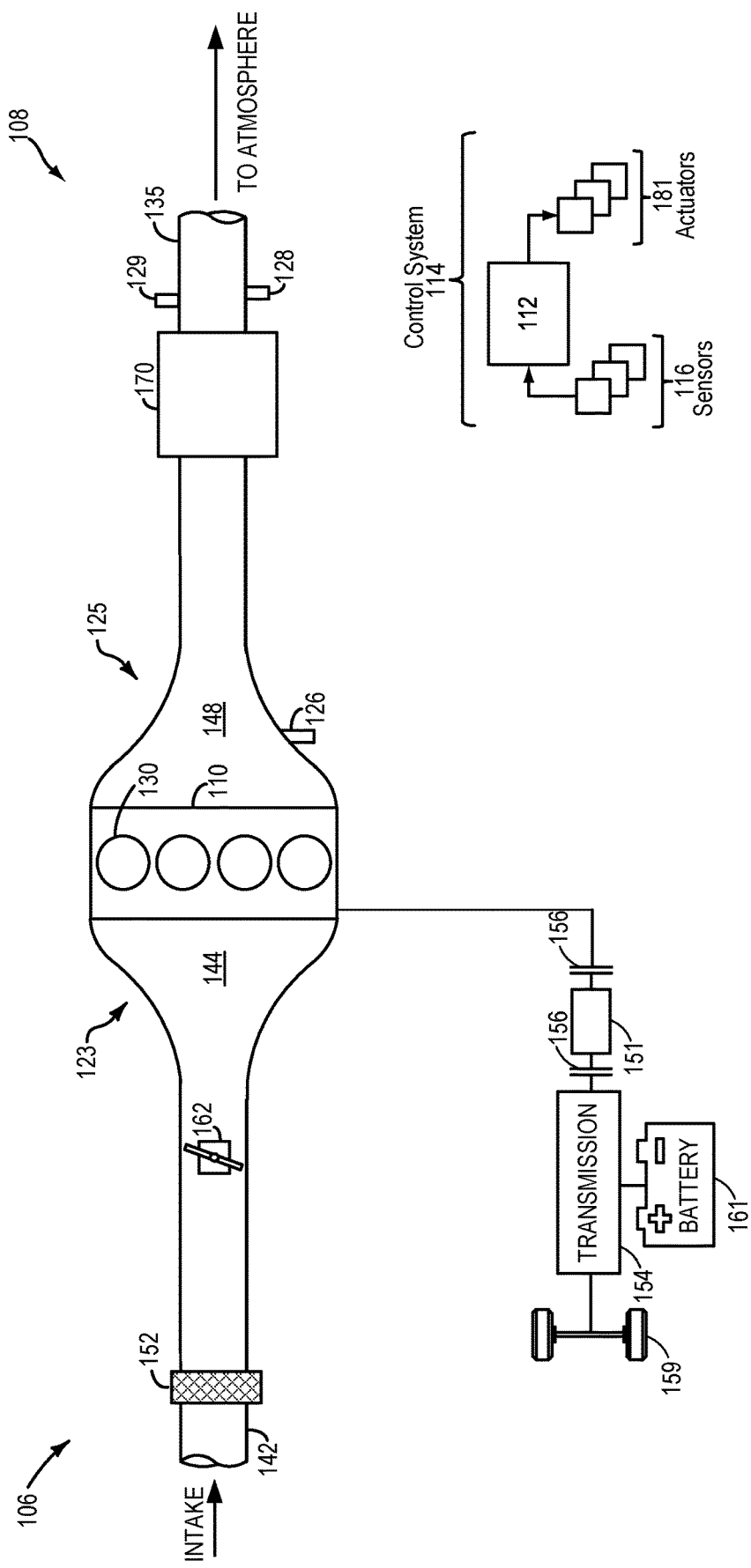
FIG. 2 illustrates a schematic of an engine included in a hybrid vehicle.

The following description relates to systems and methods for a hybrid vehicle as shown in FIGS. 1 and 2. In one example, the issues described above may be at least partially solved by a generator assembly for a hybrid vehicle. The hybrid vehicle has an internal combustion engine and an electric motor. The electric motor may be designed to drive the hybrid vehicle on its own during an all-electric mode or in tandem with the engine during a hybrid mode.

Figure 3:
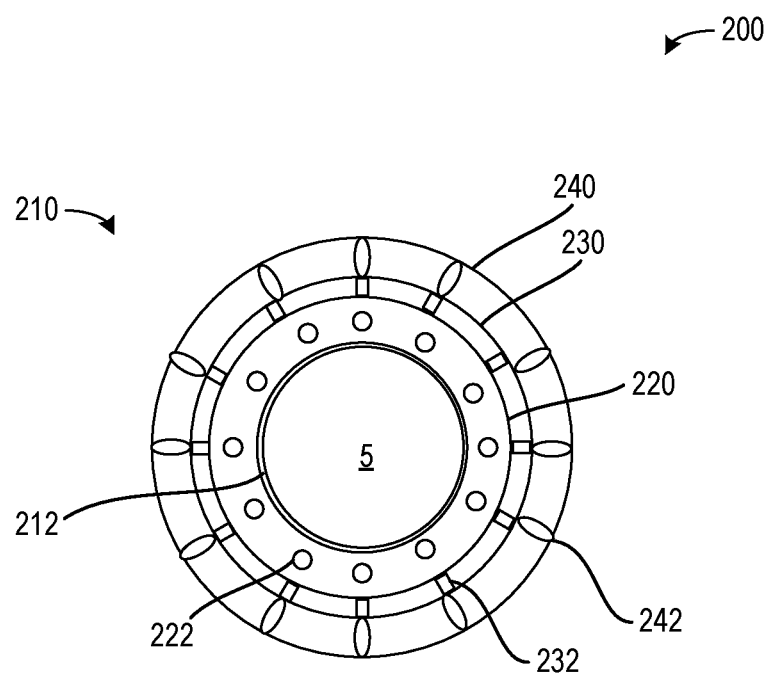
FIG. 3 illustrates an embodiment of a magnetic transmission.
Figure 4:
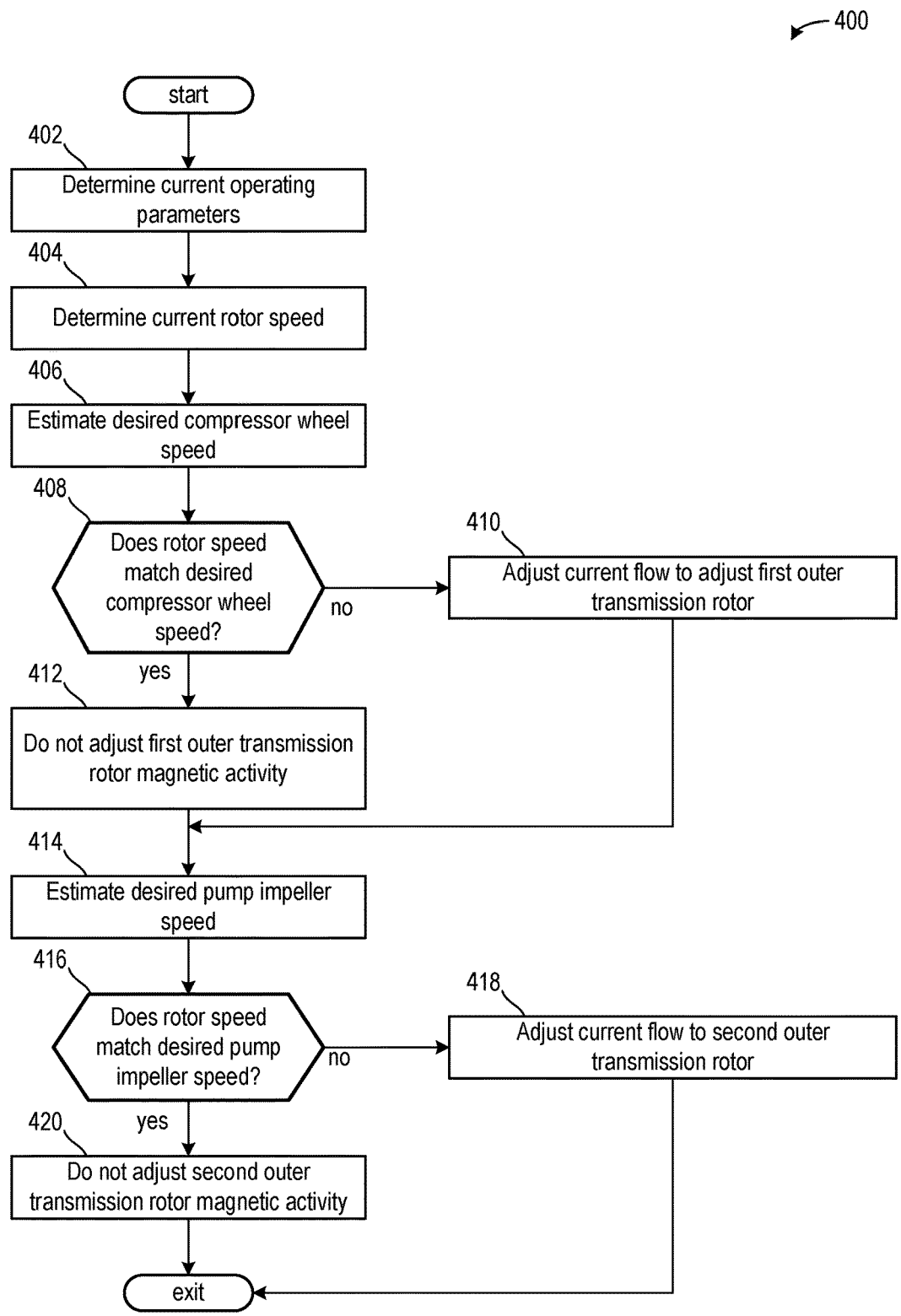
FIG. 4 illustrates a method for adjusting a magnetic field of a magnetic transmission of the generator assembly.

The generator assembly may include a generator, which, in turn, has a rotor with a rotor shaft for at least indirect connection to an internal combustion engine and has a stator. The generator is an electric machine, which can also be operated as an electric motor. This electric motor can be designed to drive the hybrid vehicle or to assist the internal combustion engine in driving. However, the generator and/or electric motor can also be an electric machine which does not contribute to the propulsion of the hybrid vehicle. The generator has a rotor and a stator, wherein the stator may be mounted in a fixed position on the vehicle body of the hybrid vehicle, while the rotor is mounted so as to be rotatable relative to the stator. The rotor has a rotor shaft, which is provided for at least indirect connection to the internal combustion engine. This is intended to mean a direct or indirect mechanical connection, e.g. via a transmission or a belt drive. The corresponding connection may be permanent in the operating state or may be designed to be separable via a clutch, for example. The rotor shaft is connected to other parts of the rotor, in particular the electric or magnetic components thereof, for conjoint rotation therewith. In the generator mode, a driving force is coupled in from the internal combustion engine via the rotor shaft, rotating the rotor relative to the stator, thereby making it possible to obtain electric energy for various purposes, e.g. for operating electric components of the hybrid vehicle or for feeding into a vehicle battery. A magnetic transmission is illustrated in FIG. 3 and a method for adjusting operation thereof is illustrated in FIG. 4.

Moreover, the generator assembly has at least one coolant pump and a compressor of an air-conditioning system, which can each be driven by the rotor and of which at least one has a rotational speed which can be modified independently of a rotational speed of the rotor via an interposed magnetic transmission. Each coolant pump is associated with a cooling circuit in which a liquid coolant, e.g. a water-glycol mixture, is delivered in the operating state. The cooling circuit passes through at least one part or at least one component of the hybrid vehicle and supplies it with coolant. In the operating state, it is not necessarily only cooling of the parts of the hybrid vehicle through which the cooling circuit passes that takes place. At least from time to time, heating may also take place. Insofar as the cooling circuit brings about cooling, wherein the coolant absorbs heat, this heat can be discharged again at some other location via a suitable heat exchanger. As will be explained below, where there is a plurality of coolant pumps, each coolant pump is generally associated with a dedicated cooling circuit. The compressor is associated with an air-conditioning system of the hybrid vehicle, wherein it may serve to compress the refrigerant in the air-conditioning system, in particular in such a way that the refrigerant transitions from the gaseous to the liquid state. At the same time, the compressor serves to deliver the refrigerant. At a different location, the refrigerant expands, wherein, in particular, it can return to the gaseous state, and absorb heat, thereby, in turn, cooling the interior of the hybrid vehicle.

Both the at least one coolant pump and the compressor can be driven by the rotor when the rotor is rotating. The elements mentioned can also be driven. In this case, the rotor can be driven either externally from the internal combustion engine via the rotor shaft, with the result that the coolant pump(s) and the compressor can also be driven indirectly via the internal combustion engine, or the generator is operated as an electric motor, with the result that said elements are operated electrically, e.g. by energy taken from a vehicle battery. Thus, at least two components (coolant pump and compressor) may be driven via the rotor, this being in contrast to concepts in the previous example in which a dedicated electric drive unit is provided for each unit. This simplifies the construction, less installation space is demanded, and the vehicle weight can be reduced.

In some examples, at least one coolant pump and/or a compressor has a rotational speed which can be modified independently of a rotational speed of the rotor via an interposed magnetic transmission. In the case of a magnetic transmission, coupling is not accomplished mechanically via non-positive engagement or positive engagement but through the action of magnetic fields. In this case, a plurality of magnets, which can be associated with an inner transmission rotor and an outer transmission rotor, is provided on the input side and on the output side. Arranged between them is a transmission stator, which has a plurality of ferromagnetic elements, via which the magnets of the inner and outer transmission rotor are coupled to one another. In a conventional magnetic transmission, all the magnets are designed as permanent magnets, and the transmission stator is held stationary. In this case, the rotational speed of the inner transmission rotor is in a fixed relationship to the rotational speed of the outer transmission rotor. However, there are various possibilities for modifying the rotational speed relationship between the outer transmission rotor and the inner transmission rotor. One examples is to provide an additional central transmission rotor instead of a stationary transmission stator. Another example is to use electromagnets instead of permanent magnets in the inner transmission rotor or in the outer transmission rotor and to periodically modify the magnetic field produced by these electromagnets. For example, it would thereby be possible to superimpose an as it were virtual rotation of the magnetic field produced on the actual physical rotation of the corresponding transmission rotor. In particular, it is possible according to the disclosure for the described modification of the magnetic field to be used to implement different rotational speed ratios. In this case, a transmission rotor (normally the inner transmission rotor) is associated with the rotor of the generator and can be secured on the rotor shaft, for example, while the other transmission rotor (normally the outer transmission rotor) is connected directly or indirectly to a coolant pump and/or to the compressor in order to drive it/them. In the case of a compressor, for example, it is also possible to achieve higher rotational speeds here than in the case of the rotor of the generator. In particular, however, the magnetic transmission can be used to adapt the rotational speed of the compressor or of the coolant pump without the need for a modification of the rotational speed of the generator. Conversely, it is conceivable to keep the rotational speed of the compressor or of the coolant pump at least approximately constant, even if the rotational speed of the generator changes. Even if the word "a" magnetic transmission is used here, this should be understood expressly in such a way that the generator assembly has at least one magnetic transmission, i.e. it is also possible for there to be a plurality of magnetic transmissions, as explained below.

Moreover, the use of a magnetic transmission may provide further benefits. Thus, no mechanical frictional losses arise within the magnetic transmission, and the electromagnetic losses due to encasing, eddy currents, and the like may be lower than losses with a mechanical transmission. Moreover, it is simpler to seal off the pump or compressor from the outside since the moving parts do not have to be coupled mechanically to the rotor. For example, an outer transmission rotor which is associated with the compressor or the coolant pump can be arranged within a sealed housing of the coolant pump without coming into contact with the rotor or other parts of the generator. In corresponding fashion, no lubrication such as that in a mechanical transmission is demanded either.

In some examples, the at least one coolant pump can be driven from the drive of the compressor. In some examples, a rotational speed of at least one coolant pump to be modifiable via a first magnetic transmission, and a rotational speed of the compressor to be modifiable via a second magnetic transmission, independently of one another and of a rotational speed of the rotor. That is to say that, in this embodiment, the generator assembly has a first magnetic transmission, which is interposed between at least one coolant pump and the rotor, and a second magnetic transmission, which is interposed between the compressor and the rotor. As a result, as in the manner explained above, the rotational speeds both of the coolant pump(s) and of the compressor can be modified independently of the rotational speed of the rotor. Since the two magnetic transmissions are independent of one another, the rotational speed of the coolant pump(s) can also be modified independently of the rotational speed of the compressor. In respect of construction, the two magnetic transmissions can be of identical or different configuration. Normally, the two magnetic transmissions are arranged offset with respect to one another in the axial direction on the rotor shaft.

In one example, the generator assembly has two coolant pumps, wherein a drive part of a first coolant pump and a drive part of a second coolant pump are coupled in a manner secure against twisting by a coupling element surrounding the rotor shaft. The respective drive part forms a moving part of the respective coolant pump and is closely associated with the actual delivery function of the pump. In some circumstances, it may also be a component which directly delivers the cooling fluid. The two drive parts are coupled by the coupling element in a manner secure against twisting, normally for conjoint rotation, that is to say in such a way that rotation of the drive parts relative to one another is possible at most to a negligible degree. The drive parts are normally rotatable coaxially with respect to the rotor shaft. They are coupled via the coupling element, which surrounds the rotor shaft. The coupling element can be of cylindrical design and can be arranged coaxially with the rotor shaft, for example. In this embodiment, the rotational speeds of the two coolant pumps may be identical at all operating conditions. The presence of the coupling element simplifies the mechanical construction inasmuch as the two drive parts can be driven jointly. If one drive part is coupled directly or indirectly via a magnetic transmission to the rotor, the at least one other drive part is automatically also coupled to the rotor, i.e. is drivable by the rotor, owing to the connection by the coupling element.

As an alternative or in addition, it would also be conceivable to use just one magnetic transmission, wherein a drive part of at least one coolant pump and a drive part of the compressor are coupled by a coupling element in a manner secure against twisting. This simplifies the overall construction since just one magnetic transmission is desired, but this may be undesired during some operating conditions where the rotational speed of the coolant pump(s) is coupled to the rotational speed of the compressor.

In particular, a magnetic transmission can be interposed between the coupling element and the rotor shaft. That is to say that the magnetic transmission is arranged between the coupling element and the rotor shaft, with the result that it is primarily the coupling element which is driven, while the drive parts are driven at the same time owing to their connection to the coupling element. In relation to the longitudinal axis of the rotor shaft, the coupling element can be arranged coaxially with the rotor shaft, wherein the drive parts are arranged radially on the outside on the coupling element. For its part, the coupling element can be rotatably mounted, e.g. via rolling bearings or other suitable bearings, but, by virtue of the magnetic transmission, is not in contact with the rotor shaft, and therefore no friction occurs between these two parts.

If two coolant pumps are operated at the same rotational speed, as described above, this could lead to the delivery rate of one of the coolant pumps not being matched to the current requirements. Via the magnetic transmission, it is possible to set the rotational speed to the optimum, e.g. in respect of one of the coolant pumps, but this could lead to a delivery rate of the other coolant pump which is either too high or too low. In order to counteract this problem, one coolant pump can preferably be set in such a way that a delivery rate can be modified independently of a rotational speed of the drive part of this coolant pump. In general, this means that at least one delivery element of the coolant pump, which interacts directly with the coolant in order to deliver said coolant, is adjustable. This adjustability allows that, in the case of an identical rotational speed for example, different delivery rates are possible, i.e. the coolant pump can operate with different efficiencies at the same rotational speed. In particular, an angle of operation of the at least one delivery element in relation to the direction of movement thereof can be modified in this case.

At least one coolant pump is configured as a centrifugal pump and, as a drive part, has a pump impeller arranged coaxially with the rotor shaft, wherein delivery elements arranged on the pump impeller can be adjusted in order to modify the delivery rate independently of a rotational speed of the pump impeller. The pump impeller normally has a plurality of blades or vanes as delivery elements, which act on the coolant. The axis of rotation of the pump impeller extends coaxially with the rotor shaft. The delivery elements are of adjustable design in order to adjust the delivery rate of the coolant pump independently of the rotational speed. It would be possible, for example, for the pump impeller to have a hub (as a drive element), in which the delivery elements are arranged, wherein the angle of attack of the individual delivery element can be modifiable by a rotation about a radially extending axis of rotation.

The generator assembly may include a first coolant pump, which is connected to a high-temperature cooling circuit that passes through the internal combustion engine. The high-temperature cooling circuit is therefore designed to pass coolant through the internal combustion engine (or a water jacket thereof), which leads to cooling in the case of a warmed-up internal combustion engine. In some circumstances, the high-temperature cooling circuit may be of branched design in order, for example, to reach other vehicle components apart from the internal combustion engine or, on the one hand, to pass through a water jacket of an engine block and, on the other hand, to pass through a water jacket of a cylinder head. As an alternative or in addition to such a parallel arrangement within the high-temperature cooling circuit, a serial arrangement is also possible, in which components are arranged in series in the cooling circuit, with the result that the coolant flows through these components in succession. In each case, the high-temperature cooling circuit also passes through a heat exchanger, normally a main radiator of the hybrid vehicle, which can be arranged at the front behind a radiator grill. In this context, the term "high-temperature cooling circuit" should not be interpreted restrictively but serves primarily to make a conceptual distinction relative to a low temperature cooling circuit. However, the internal combustion engine or a part thereof is generally the hottest vehicle component in the operating state, for which reason also the coolant can reach a high temperature after passing through the internal combustion engine.

In some examples, additionally or alternatively, the generator assembly has a second coolant pump, which is connected to a low-temperature cooling circuit. The term "second coolant pump" serves to make a conceptual distinction and does not imply that the generator assembly in this embodiment includes the abovementioned first coolant pump. As explained above in respect of the high-temperature cooling circuit, the term "low-temperature cooling circuit" should also not be interpreted restrictively, even if the low-temperature cooling circuit typically cools vehicle components which reach a lower temperature in the operating state than the internal combustion engine or in which significantly less heat is generated. It can be used to cool various electric components, for example. The low-temperature cooling circuit too passes through a heat exchanger, e.g. a heater core of the air conditioning system, via which the vehicle interior can be heated. If the low-temperature cooling circuit passes through a plurality of vehicle components, then, here too, both a parallel arrangement and a serial arrangement are possible. In one example, a temperature of the low-temperature cooling circuit is less than a temperature of the high-temperature cooling circuit.

The generator may be at least connectable to the low-temperature cooling circuit. Here and below, "at least connectable" means that there is either a permanent connection or a connection that can be established optionally, this relating in each case to a fluid-carrying connection. A connection that can be established optionally can be implemented via one or more valves. That is to say that part of the low-temperature cooling circuit passes through the generator, thus enabling coolant to be passed through the generator. This is desired inasmuch as cooling the generator exclusively via air may not be adequate in some circumstances. On the other hand, the heat output produced in the generator is generally significantly less than that in the internal combustion engine, for which reason inclusion in the low-temperature cooling circuit instead of the high-temperature cooling circuit is sufficient.

As an alternative or in addition, the generator can be at least connectable to an air-conditioning cooling circuit of the air-conditioning system. The air-conditioning cooling circuit is that circuit, belonging to the air-conditioning system, in which the refrigerant is conveyed. As is known, the air-conditioning cooling circuit has not only the compressor but also a region in which the refrigerant expands, absorbing heat as it does so. As already explained above, the compressor often brings about condensation, while the expansion leads to evaporation of the refrigerant. In this embodiment, it is possible, in particular, for a bypass line of the air-conditioning cooling circuit, which bypasses the evaporator, to be passed through the generator. By at least temporary connection of the generator to the air-conditioning cooling circuit, the temperature of the refrigerant, which is generally still reduced even after heat exchange, e.g. with the interior air of the vehicle, can be used to at least proportionately cool the generator. That is to say that a still available "residual cold" of the refrigerant is used here.

In some conditions, the generator is operated as a power converter, which, as a frequency converter or a rectifier for example, can serve to convert the AC voltage produced in the generator to a different frequency or to convert it into DC voltage. When the generator is operated as an electric motor, on the other hand, the frequency converter can also serve as an inverter to produce an alternating voltage of suitable frequency, e.g. on the basis of a DC voltage made available by a vehicle battery. The power converter can be at least connectable to the low-temperature cooling circuit and/or the air-conditioning cooling circuit. Within the power converter too, a heat output can be produced owing to electrical resistances, and this could lead to undesired heating of the power converter. In some cases, indirect cooling of the power converter could be accomplished by contact with the generator, for example. In some circumstances, however, direct cooling, as described here, is also desired, wherein at least one line of the low-temperature cooling circuit or of the air-conditioning cooling circuit passes through the power converter. Within the respective cooling circuit, it is possible, in particular, for the power converter to be arranged in parallel with the generator.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a generator assembly 1 according to the disclosure for a hybrid vehicle. The generator assembly 1 may include a generator 2 including a stator 3, which is secured in a fixed manner on the vehicle body, and a rotor 4, which is mounted so as to be rotatable relative to the stator 3. The rotor 4 has a rotor shaft 5, which can be connected to an internal combustion engine 13 of the hybrid vehicle, e.g. via a belt pulley 7 illustrated here or, alternatively, via other elements, thus enabling it to be driven by the internal combustion engine 13. In this generator mode, electric voltage is produced, which can be rectified by a power converter 6, for example, in order to feed the power obtained into a vehicle battery (shown in FIG. 2).

Conversely, the power converter 6 can also provide an operating voltage of suitable frequency, thus enabling the generator 2 to be operated as an electric motor. In this motor mode, the rotor 4 is driven by the rotor shaft 5 independently of the internal combustion engine 13. As an option, it is also possible in the motor mode for the generator 2 to serve at least in an auxiliary capacity in driving the hybrid vehicle, that is to say, via the belt pulley 27 or some other suitable connecting element, it can transmit a driving force, via which the wheels of the hybrid vehicle can be driven at least proportionately.

A coupling element 7, which may include a hollow-cylindrical shape, may be arranged coaxially with the rotor shaft 5 and is mounted so as to be rotatable relative to the rotor shaft 5 and to the stator 3. Via the coupling element 7, a pump impeller 11 of a first coolant pump 10 and a pump impeller 16 of a second coolant pump 15 may be connected to one another for conjoint rotation. The first coolant pump 10 belongs to a high-temperature cooling circuit 12, which passes through the internal combustion engine 13, a (dual) heater core 19 of an interior heating system of the hybrid vehicle, and a main radiator 14 of the hybrid vehicle. The coolant contained in the high-temperature cooling circuit 12 is driven by the first coolant pump 10 and, when the internal combustion engine 13 has heated up sufficiently, absorbs heat as it passes through the latter and releases this heat at the heater core 19 to the interior of the hybrid vehicle and, at the main radiator 14, to the vehicle environment.

The second coolant pump 15 belongs to a low-temperature cooling circuit 17, which, on the one hand, passes through the generator 2 and the power converter 6 and, on the other hand, passes through a further electric device 18 (illustrated schematically here) and the heater core 19. The coolant contained in the low-temperature cooling circuit 17 is delivered by the second coolant pump 15 and, as it passes through the generator 2, the power converter 6 and the electric device 18, normally absorbs heat, which it can release once again to the interior of the vehicle as it passes through the heater core 19. In this illustration, the low-temperature cooling circuit 17 is divided into two parallel branches, of which one passes through the generator 2 and the frequency converter 6 and the other passes through the electric device 18 and the heater core 19. This should be understood to be purely illustrative, and it would also be possible for the generator 2, the frequency converter 6 and the electric device 18 to be arranged in series, i.e. in succession, within the low-temperature cooling circuit 17.

The generator assembly 1 may further include a compressor 20 with a compressor wheel 21. The compressor 20 is connected to an air-conditioning cooling circuit 22, which leads from the compressor 20, via a condenser 23 and an expansion valve (not illustrated here) to an evaporator 24 and back via the generator 2 and the power converter 6 to the compressor 20. The compressor 20 forcibly compresses the refrigerant, which liquefies in the condenser 23 and is likewise conveyed by the action of the compressor 20, via the expansion valve mentioned, to the evaporator 24, where it evaporates and expands and, in the process, absorbs heat, which can be withdrawn from the air in the vehicle interior.

The refrigerant can also absorb heat as it passes through the generator 2 and the power converter 6, before it reaches the compressor 20 again. As an option, at least some of the refrigerant can be taken past the evaporator 24 via a bypass line 25, with the result that it passes only through the generator 2 and the power converter 6. It is thereby possible, on the one hand, to mix cooler refrigerant with warmer refrigerant from the evaporator in order maintain desired refrigerant temperatures. On the other hand, it is thereby possible to enhance the cooling of the generator 2 and the power converter 6 if desired. The corresponding bypass line 25 is provided with a valve 26, via which it can be closed or opened when desired.

During the operation of the hybrid vehicle, a rotational speed of the rotor 4 can vary, e.g. in the generator mode as a function of the rotational speed of the internal combustion engine 13. The respective rotational speed of the rotor 4 may differ from an instantaneously optimum rotational speed of the coolant pumps 10, 15 (or of the pump impellers 11, 16) and/or from an optimum rotational speed of the compressor 20 (or of the compressor wheel 21). In order to set a rotational speed which is suitable for at least one of the coolant pumps 10, 15, the coupling element 7 is coupled to the rotor shaft 5 via an interposed first magnetic transmission 8. Accordingly, the pump impellers 11, 16 are also coupled to the rotor shaft 5 via the coupling element 7 and the magnetic transmission 8. In order to set a rotational speed which is suitable for the compressor 20, the compressor wheel 21 is coupled to the rotor shaft 5 via an interposed second magnetic transmission 9. The magnetic transmissions 8, 9, which are illustrated schematically here, each have an inner transmission rotor, which is connected to the rotor shaft 5, an outer transmission rotor, which is connected to the coupling element 7 or the compressor wheel 21, and an interposed transmission stator.

In this case, both the rotational speed of the coupling element 7 and the rotational speed of the compressor wheel 21 can be modified independently of the rotational speed of the rotor shaft 5. For this purpose, the inner transmission rotor, for example, can have a plurality of permanent magnets, which interact via interposed ferromagnetic elements of the transmission stator with a plurality of electromagnets of the outer transmission rotor. Here, the magnetization of the electromagnets can be modified periodically, with the result that a virtual rotation of the magnetic field is superimposed on the physical rotation of the outer transmission rotor relative to the inner transmission rotor. It is thus possible in the case of a constant rotational speed of the rotor shaft 5, for example, to implement different rotational speeds of the coupling element 7 or, in the case of different rotational speeds of the rotor shaft 5, to implement an approximately constant rotational speed of the coupling element 7. The same applies to the rotational speed of the compressor wheel 21 in relation to the rotational speed of the rotor shaft 5. In this way, it is possible, even in the case of low rotational speeds of the rotor 4 for example, to implement an optimum rotational speed of the compressor wheel 21 as well as, independently thereof, an optimum rotational speed of the coupling element 7 and thus of the pump impellers 11, 16. The pump impellers 11, 16 of the two coolant pumps 10, 15 are connected to one another for conjoint rotation therewith and therefore have the same rotational speed. Depending on the operating state of the hybrid vehicle and of the vehicle components to be cooled, this could lead to excessive coolant delivery and thus to excessive cooling. For this reason, the pump impellers 11, 16 each have adjustable blades or vanes, the angle of attack of which in relation to the axis of rotation of the pump impeller 11, 16 can be modified. In this way, the delivery rate of the respective coolant pump 10, 15 can be modified independently of the rotational speed thereof. Alternatively, adjustable blades may be included on only one of the pump impellers 11, 16.

Overall, it is possible with the generator assembly 1 according to the disclosure to drive two coolant pumps 10, 15 for two independent cooling circuits 12, 17 as well as the compressor 20 of a third cooling circuit 22 via a single rotor shaft 5. Nevertheless, the coolant flow can be set as desired in each of the cooling circuits 12, 17, 22 via the magnetic transmissions 8, 9 and via the adjustable pump impellers 11, 16.

FIG. 2 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 may be used similarly to engine 13 of FIG. 1. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

Turning now to FIG. 3, it shows an embodiment 200 of a magnetic transmission 210. In one example, the magnetic transmission 210 may be used similarly to the first magnetic transmission 8 and/or the second magnetic transmission 9 of FIG. 1. In this way, the magnetic transmission 210 may output to the coupling element 7 or to the compressor wheel 21 of FIG. 2.

The magnetic transmission 210 may include an inner transmission rotor 220 spaced away from the rotor shaft 5 via an air gap 212. The air gap 212 may be configured to minimize frictional losses between the magnetic transmission 210 and the rotor shaft 5. Furthermore, the magnetic transmission 210 and the air gap 212 may reduce a use of seals and bearings, thereby increasing a longevity of the magnetic transmission relative to the previous examples described above. The inner transmission rotor 220 may further include a plurality of magnets 222. The plurality of magnets 222 may be permanent magnets, wherein the plurality of magnets 222 may constantly be producing a magnetic field.

A transmission stator 230 may be arranged radially outside of the inner transmission rotor 220. The transmission stator 230 may include a plurality of magnets 232. In one example, the plurality of magnets 232 may be ferromagnets in constant magnetic engagement with the plurality of magnets 222 of the inner transmission rotor 220.

An outer transmission rotor 240 may be arranged radially outside of the transmission stator 230. In one example, the outer transmission rotor 240, the transmission stator 230, and the inner transmission rotor 220 are concentric about the rotor shaft 5. In one example, the outer transmission rotor 240 comprises a plurality of magnets 242. In one example, the plurality of magnets 242 may be electromagnets, wherein a magnetic activity of the electromagnets may be adjusted based on an electric current applied thereto.

In one example, a rotational speed of outer transmission rotor 240 may be adjusted to a different rotational speed than that of the rotor shaft 5. This may be accomplished via adjusting a magnetic field produced by the plurality of magnets 242 via adjusting a current applied thereto. For example, for a given rotational speed of the rotor shaft 5, the magnetic operation of the plurality of magnets 242 may be adjusted to implement different rotational speeds of the coupling element 7 or to the compressor wheel. In this way, it is possible, even in the case of low rotational speeds of the rotor 4 of FIG. 1 for example, to implement an optimum rotational speed of the compressor wheel 21 or of the coupling element 7.

In this way, an electric motor/generator may be integrated with an air-conditioning compressor and a main water pump. The main water pump may be mechanically coupled to a secondary water pump, the main water pump configured to drive coolant through a high-temperature coolant circuit and the secondary water pump configured to drive coolant through a low-temperature coolant circuit. In one example, the main water pump and the secondary water pump may comprise variable vanes configured to adjust an output thereof. Additionally or alternatively, a magnetic transmission between a rotor shaft and a coupling element of the main water pump may have its magnetic field adjusted to adjust an output of the main water pump. The magnetic transmission may experience reduced frictional losses relative to the previous examples described above due to an air gap (e.g., air gap 202 of FIG. 3) being arranged between the rotor shaft and the magnetic transmission.

Turning now to FIG. 4, it shows a method 400 for operating the first and second magnetic transmissions to operate the compressor and coolant pumps. Instructions for carrying out method 400 may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

The method 400 begins at 402, which includes determining, estimating, and/or measuring current operating parameters. Current operating parameters may include but are not limited to manifold vacuum, throttle position, engine temperature, engine speed, engine activation/deactivation, vehicle speed, and air/fuel ratio.

The method 400 may proceed to 404, which includes determining a current rotor speed. The rotor speed may be based on an electric motor magnetic field and an electric current provided to windings, such as windings of a stator. Additionally or alternatively, the rotor speed may be directly measured via a sensor configured to sense a speed of the rotor shaft.

The method 400 may proceed to 406, which includes estimating a desired compressor wheel speed. In one example, the desired compressor wheel speed is based on an air-conditioning demand. That is to say, the compressor wheel speed may increase in response to a cooler interior cabin temperature being requested, for example, where an air-conditioning setting is increased.

The method 400 may proceed to 408, which includes determining if the rotor speed matches the desired compressor wheel speed. In one example, the rotor shaft interacts with the first magnetic transmission to drive a compressor wheel of an air-conditioning device. If the rotor speed does not match the desired compressor wheel speed, then the method 400 may proceed to 410, which includes adjusting a current electrical flow a first outer transmission rotor magnetic activity. In one example, flowing more current increases the magnetic activity and therefor further increases a speed of the compressor wheel relative to the rotor shaft. Thus, flowing less current decreases the magnetic activity and therefor decreases the speed of the compressor wheel relative to the rotor shaft. In this way, the air-conditioning demand may be accurately met during a plurality of conditions independent of the rotor speed.

If the rotor speed does match the desired compressor wheel, then the method 400 may proceed to 412, which does not adjust the first outer transmission rotor magnetic activity. As such, an electric current flow to the outer transmission rotor may be maintained.

Following 410 or 412, the method 400 proceeds to 414 to estimate a desired pump impeller speed. In one example, the pump impeller speed is based on thermal demands on one or more components arranged along a high-temperature coolant line. In one example, an engine cooling demand may set the desired pump impeller speed. As described above, a second pump impeller may be rotatably coupled to a first pump impeller, wherein the second pump impeller may adjust coolant flow through a low-temperature coolant line. In one example, the second pump impeller speed may be adjusted relative to a first pump impeller speed via a coupling therebetween (e.g., a magnetic coupling).

The method 400 may proceed to 416, which includes determining if the rotor shaft speed matches a desired pump impeller speed. If the rotor shaft speed does not match the desired pump impeller speed, then the method 400 proceeds to 418, which includes adjusting an electrical current flow to the second outer transmission rotor to adjust its magnetic activity. In one example, increasing the current flow may increase the magnetic activity, which may increase the pump impeller speed to provide increased coolant flow. Alternatively, decreasing the current flow may decrease the magnetic activity, which may decrease the pump impeller speed to provide decreased coolant flow. In one example, increased coolant flow may be desired during high engine loads and decreased coolant flow may be desired during a cold-start or during an engine start/stop.

If the rotor shaft speed does match the desired pump impeller speed, then the method 400 proceeds to 420, which includes not adjusting an electric current flow to the second outer transmission rotor to maintain a current magnetic activity.

In this way, a magnetic transmission may provide variable speeds to an AC compressor and a water pump. The magnetic transmission may generate different output speeds via adjusting a magnetic field of the magnetic transmission. As such, even during lower rotor shaft speeds, higher AC compressor outputs may still be achieved while decreasing a packaging size, weight, and cost of previous auxiliary transmission systems.

The technical effect of the magnetic transmission of the present disclosure is to provide variable outputs speeds to one or more auxiliary drive system while decreasing a packaging size and cost compared to previous examples.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a generator comprising a rotor and a rotor shaft;
   an air-conditioner compressor; and
   a coolant pump; wherein
   a first magnetic transmission is configured to output power from the rotor shaft to the coolant pump; and
   a second magnetic transmission is configured to output power from the rotor shaft to the air-conditioner compressor.

2. The system of claim 1, wherein a magnetic field of the first magnetic transmission is adjustable independently of a magnetic field of the second magnetic transmission.

3. The system of claim 1, wherein the coolant pump is a high-temperature coolant circuit coolant pump, further comprising a coupling element coupling the high-temperature coolant circuit coolant pump to a low-temperature coolant circuit coolant pump.

4. The system of claim 3, wherein the coupling element receives an output of the first magnetic transmission.

5. The system of claim 3, wherein an internal combustion engine is arranged along a high-temperature coolant circuit and wherein a power converter is arranged along a low-temperature coolant circuit.

6. The system of claim 1, wherein the first magnetic transmission comprises an inner transmission rotor, a transmission stator, and an outer transmission rotor.

7. The system of claim 6, wherein the inner transmission rotor comprises a first plurality of magnets, the transmission stator comprises a second plurality of magnets, and the outer transmission rotor comprises a third plurality of magnets.

8. The system of claim 7, wherein the first plurality of magnets and the second plurality of magnets comprises fixed magnetic fields, and wherein a magnetic field of the third plurality of magnets is adjustable.

9. The system of claim 8, wherein the second magnetic transmission is identical to the first magnetic transmission.

10. The system of claim 6, wherein an air gap is arranged between the inner transmission rotor and the rotor shaft.

11. A hybrid vehicle, comprising:
    an engine and a generator, wherein the generator comprises a rotor, a stator, and a rotor shaft;
    a first pump configured to adjust a coolant flow through a high-temperature coolant circuit;
    a second pump configured to adjust a coolant flow through a low-temperature coolant circuit, wherein a temperature of the low-temperature coolant circuit is lower than a temperature of the high-temperature coolant circuit;
    an air conditioner compressor;
    a first magnetic transmission configured to output power from the rotor shaft to the first pump and the second pump;
    a second magnetic transmission configured to output power from the rotor shaft to a compressor wheel of the air conditioner compressor; and
    a controller comprising computer-readable instructions stored on non-transitory memory thereof that when executed enable the controller to:
    adjust a magnetic field of the first magnetic transmission in response to a desired speed of a first pump impeller or a second pump impeller not matching a speed of the rotor shaft; and
    adjust a magnetic field of the second magnetic transmission in response to a desired speed of the compressor wheel of the air conditioner compressor not matching the speed of the rotor shaft.

12. The hybrid vehicle of claim 11, wherein the first magnetic transmission and the second magnetic transmission are identical, each comprising an inner transmission rotor, a transmission stator, and an outer transmission rotor, wherein the outer transmission rotor comprising a plurality of electromagnets.

13. The hybrid vehicle of claim 12, wherein the controller is configured to adjust an electric current flow to the plurality of electromagnets to adjust the magnetic field of the first magnetic transmission and the second magnetic transmission.

14. The hybrid vehicle of claim 12, wherein the inner transmission rotor is spaced away from the rotor shaft.

15. The hybrid vehicle of claim 14, wherein an air gap is arranged between the inner transmission rotor and the rotor shaft.

16. The hybrid vehicle of claim 12, wherein the inner transmission rotor comprises a plurality of permanent magnets with a fixed magnetic field.

17. The hybrid vehicle of claim 12, wherein the generator is an electric motor.

* * * * *